United States Patent [19]
Turk et al.

[11] Patent Number: 5,639,492
[45] Date of Patent: Jun. 17, 1997

[54] METHOD AND COMPOSITION FOR ACHIEVING ANIMAL WEIGHT GAIN WITH MYCOTOXIN-CONTAMINATED ANIMAL FOOD

[75] Inventors: Katherine R. Turk, Twin Lakes, Wis.; Lawrie Music, Rolling Meadows; Gary W. Beall, McHenry, both of Ill.

[73] Assignee: Amcol International Corporation, Arlington Heights, Ill.

[21] Appl. No.: 372,442

[22] Filed: Jan. 13, 1995

[51] Int. Cl.$^6$ .................. A22K 1/00; A23K 1/18; B01J 20/12; B01J 20/30
[52] U.S. Cl. .................. 426/2; 426/74; 426/623; 426/630; 426/807; 502/81; 502/82; 502/83
[58] Field of Search .................. 426/2, 74, 623, 426/630, 807; 502/81, 82, 83

[56] References Cited

U.S. PATENT DOCUMENTS

| | | |
|---|---|---|
| 3,687,680 | 8/1972 | Krchnavi et al. .................. 99/4 |
| 4,717,699 | 1/1988 | Mickelson .................. 502/83 |
| 5,149,549 | 9/1992 | Beggs .................. 426/2 |
| 5,192,547 | 3/1993 | Taylor .................. 426/2 |

FOREIGN PATENT DOCUMENTS

| | | |
|---|---|---|
| 1 058 887 | 3/1992 | China . |
| 56-0011 758 | 2/1981 | Japan . |
| WO92/05706 | 4/1992 | WIPO . |

OTHER PUBLICATIONS

Harvey, R.B., "Counteracting Aflatoxin In Livestock Feed", NTIS Tech. Notes, Springfield, Virginia, pp. 675–676, (Sep., 1990).

*Primary Examiner*—Esther Kepplinger
*Assistant Examiner*—Choon P. Koh
*Attorney, Agent, or Firm*—Marshall, O'Toole, Gerstein, Murray & Borun

[57] ABSTRACT

A method of increasing the nutritional value of mycotoxin-contaminated animal feed ingested by an animal by feeding the animal an acid-activated montmorillonite clay simultaneously with the mycotoxin-contaminated or ergot-contaminated animal feed. The acid-activated montmorillonite clay can be fed to the animal in any form, e.g., granular, powder, pellets and the like or can be admixed with other animal food or feed supplements, so long as the clay is present in the animal's stomach (digestive tract) at the same time as the mycotoxin-contaminated animal feed in an amount sufficient to absorb or adsorb mycotoxin from the digestive tract of the animal and thereby aid the animal in metabolic absorption of nutrients from the contaminated animal feed.

19 Claims, No Drawings

METHOD AND COMPOSITION FOR ACHIEVING ANIMAL WEIGHT GAIN WITH MYCOTOXIN-CONTAMINATED ANIMAL FOOD

FIELD OF THE INVENTION

The present invention is directed to a method of retarding or ameliorating the absorption of a broad spectrum of mycotoxins in animals, to improve the metabolic capacity of the animal to deal with mycotoxins, by feeding the animals an acid-activated montmorillonite (smectite) clay, particularly an acid-activated calcium bentonite clay, simultaneously with mycotoxin-contaminated nutrients, such that the acid-activated montmorillonite clay and the nutrients are digested together. The acid-activated montmorillonite clay digested with the mycotoxin-contaminated animal feed, such as corn or peanuts, retards the absorption of mycotoxin-contaminants in the food and permits the mycotoxin to be eliminated in the animal's stool together with the montmorillonite clay.

BACKGROUND OF THE INVENTION

Mycotoxins are the toxic metabolites resulting from fungal infestation and growth on cereal grains and can result during growth, harvest, transportation or storage of the grains. While mycotoxins have been a problem for centuries, it was not until 1960 that significant research efforts in the role of mycotoxins in animal production occurred. The incident which spurred this interest was the realization of the causal nature of aflatoxins in a disease called Turkey X disease in turkey poults in Great Britain.

Mycotoxin contamination of cereal grains is a relatively common problem. The exact type and extent of the problem is a function of mold types, growing conditions during the crop season and storage practices. Aflatoxins are a mycotoxin of particular concern since aflatoxin $B_1$ is one of the most potent known hepatocarcinogens. Aflatoxin ingestion is invariably accompanied by a reduction in feed intake and, consequently, a reduction in growth rate of pigs and other animals. Other mycotoxins of concern that the acid-activated clays of the present invention are effective against include fumonisin; vomitoxin; ochratoxin and zearalenone. Alkaloids of the ergot family, such as ergotamine and ergovalene, are also of major concern.

There has been much recent interest in the use of products which are already approved as anticaking agents or pelleting aids in feed manufacturing as ameliorators of the adverse effects of aflatoxin ingestion in swine. A hydrated attapulgite clay (sodium calcium aluminosilicate), selenium, and folic acid (a B-vitamin) presently are used as feed supplements for ameliorating the effects of aflatoxin-contaminated feeds on animals, such as pigs. A calcium bentonite clay present on the market for this purpose is NOVASIL marketed by Engelhard Corporation, Cleveland, Ohio.

While the acute symptoms of mycotoxins, e.g., aflatoxicosis, in swine are relatively easy to identify and the economic losses evident, the chronic symptoms of slightly diminished performance and immunosuppressive effects probably constitute a much greater economic loss in pork production than for other animals, e.g., beef. Traditional methods of dealing with grains known to be contaminated with mycotoxins are: blending with "clean" grain to reduce the contamination level; screening or other means of physical separation to remove highly contaminated fines; and ammoniation or heating to detoxify the grain. These methods, however, are not effective against ergots. Of more recent interest in the U.S. is the use of products which are already approved as anticaking agents or pelleting aids to reduce the adverse effects of aflatoxin ingestion.

This Assignee's earlier patent to Beggs, U.S. Pat. No. 5,149,549, discloses the use of natural bentonire clays (sodium or calcium) for use as a feed supplement to prevent the absorption of toxins into an animal's bloodstream. Previously, montmorillonite clays were not known to provide any advantage in permitting almost unhindered weight gain in animals fed mycotoxin-contaminated grains, such as corn. As far as Applicants are aware, however, acid-activated montmorillonite clays have not been used as a feed supplement to prevent the absorption of toxins into an animal's bloodstream.

The acid-activated montmorillonites are most effective with animal feeds contaminated with at least about 400 parts per billion (ppb) mycotoxin, and most significant amelioration of animal weight reduction is achieved at animal feed contamination levels of at least about 800 parts per billion mycotoxin, based on the total weight of contaminated feed. Some benefit is achieved, however, with acid-activated montmorillonite clay fed to animals so long as the animal feed has sufficient mycotoxin contamination to cause measurably less weight gain in the animal, as compared to a controlled feed that is not contaminated, e.g., at least about 50 to about 100 parts per billion mycotoxin contamination. The acid-activated montmorillonite should be fed to the animal in an amount sufficient to aid in the metabolic absorption of nutrients from the mycotoxin-contaminated animal feed, e.g., about 0.01% to about 1% based on the weight of the contaminated animal feed. Higher percentages of acid-activated montmorillonite clay, based on the weight of mycotoxin-contaminated animal feed, can be used without any adverse effect, but without significant advantage.

Accordingly, one aspect of the present invention is to provide a method of increasing the amount of nutrients absorbed by an animal that is fed mycotoxin-contaminated food by feeding the animal an acid-activated montmorillonite clay in addition to the contaminated food.

Another aspect of the present invention is to provide a method of increasing the weight gain achievable by feeding an animal mycotoxin-contaminated feed by simultaneously feeding the animal one or more acid-activated montmorillonite clays with the mycotoxin-contaminated feed.

Another aspect of the present invention is to provide a mycotoxin-contaminated animal food supplement comprising an acid-activated montmorillonite clay for addition to the contaminated feed in an amount of at least about 0.01% based on the weight of the mycotoxin-contaminated animal feed.

Still another aspect of the present invention is to provide a method of increasing the weight gain achievable by feeding an animal mycotoxin-contaminated feed by simultaneously feeding the animal an acid-activated smectite clay, particularly an acid-activated calcium bentonite clay.

The above and other aspects and advantages of the present invention will become more apparent from the following detailed description of the preferred embodiments of the present invention.

DETAILED DESCRIPTION OF THE PREFERRED EMBODIMENTS

The present invention is based upon the surprising discovery that acid-activated montmorillonite clays, particularly an acid-activated calcium bentonite clay, fed to animals that are fed a mycotoxin-contaminated animal feed, will unexpectedly provide for almost unhindered weight gain, approximately the same as would occur if the feed were not contaminated. The particular form of the clay, e.g., powdered, granular, compressed, dried, wet, non-compressed, pelletized, and the like, should not matter so long as the animal ingests the acid-activated montmorillonite clay before, after or during the ingestion of the contaminated animal feed. In this manner, the acid-activated montmorillonite clay and the mycotoxin-contaminated feed are in the animal's stomach and/or rumen simultaneously, so that the mycotoxin contamination can be sorbed (absorbed and/or adsorbed) by the acid-activated montmorillonite clay to aid the animal to metabolize the nutrients from the feed without significant hindrance from the mycotoxin contamination.

All acid-activated calcium montmorillonite clays aid an animal's metabolic absorption of nutrients from mycotoxin-contaminated animal feed in accordance with the method of the present invention. In accordance with one important embodiment of the present invention, the acid-activated calcium montmorillonite clay is calcium bentonite. The bentonite utilized in accordance with the present invention may also contain other cations such as sodium, magnesium, lithium and iron. To achieve the full advantage of the present invention, the bentonite clay that is acid-activated should have calcium as its predominant exchangeable cation. The acid-activated montmorillonite clay may be dioctahedral or trioctahedral, such as any of the smectite clays or mixtures thereof.

A preferred acid-activated clay for use in conjunction with a mycotoxin-contaminated animal feed, in accordance with the present invention, is an acid-activated calcium bentonite clay, or bleaching earth. Calcium bentonite clay is acid-activated, and commonly used to bleach oils, by treating the clay with a mineral acid, such as hydrochloric or sulfuric acid and then washing the treated clay substantially free of dissolved salts and residual acid.

The general process of acid activation of clays, as used today in industry, includes grinding the clay at a moisture content below about 20% by weight for uniform activation and dispersion in water; slurrying the ground clay in water and then adding acid to the clay slurry in an attempt to achieve a substantially uniformly activated clay. The clay/acid slurry is agitated for a time sufficient and at a temperature sufficient, e.g., 80°–100° C., so that the acid reacts with a portion of the clay and, thereafter, the acid-treated clay is separated from the acid solution; the clay then is washed to remove most of the acid solution from the clay; filtered to a liquid content less than about 60% by weight and thereafter dried to a liquid content less than about 20% by weight. The acid concentration in the acid/clay slurry is generally about 10% to about 35% by weight.

The acid-activation process is useful with any of the clays known to be used in bleaching or decolorizing by filtration, such as any of the bentonires, including swelling bentonires such as sodium bentonites or the non-swelling bentonites such as calcium or magnesium bentonire. The process is also useful for clays dominated by high contents of smectite type clay minerals, such as any of the montmorillonites, nontronite and saponite, illite and hydrous mica types of clay minerals, halloysite, and slaking-type bentonires. Usually about 6 to 8 hours of acid digestion is necessary to properly acid activate the clay. The digested slurry then is washed substantially free of dissolved salts such as iron and aluminum sulfates or chlorides, depending upon the particular mineral acid used. The acid-activated clay then is dewatered, such as by filtration, and the resulting filter cake is dried and subsequently ground to product specifications.

Existing commercial processes using a filter press for filtration and washing result in a filter cake having about 35% to 40% by weight solids. Filtration at higher solids contents is possible in accordance with the teachings of this Assignee's Mickelson, et al. U.S. Pat. No. 4,717,699, hereby incorporated by reference.

The following patents, hereby incorporated by reference, describe various processes for treatment of smectite clays to enhance the filtering characteristics of the clay in the removal of colorizing compounds: U.S. Pat. Nos. 1,408,655; 1,524,843; 1,408,656; 1,402,112; 1,544,210; 1,731,702; 1,739,734; and 4,847,226.

The results of adsorption experiments with a selected number of mycotoxins are contained in Table 1 on several different types of sorbents. These materials are far superior to any type of untreated bentonite, either in the Na or Ca form.

TABLE 1

MYCOTOXIN ABSORBENCY PERCENTAGES

| Mycotoxin | Clay 1 | Clay 2 | Clay 3 | Clay 4 | Clay 5 | Clay 6 | Clay 7 |
|---|---|---|---|---|---|---|---|
| Fumonisin (Neutral pH) | 2.9 | 23.1 | 21.0 | 1.1 | 14.3 | 96.7 | 8.7 |
| Fumonisin (pH 2) | N/A | 100 | 97.5 | N/A | N/A | 100 | N/A |
| Fumonisin (pH 3) | N/A | 96.8 | 88.5 | N/A | N/A | 95.2 | N/A |
| Fumonisin (pH 4) | N/A | 95.5 | 91.2 | N/A | N/A | 93.7 | N/A |
| Ergotamine (Neutral pH) | 85.1 | 92.3 | 94.3 | 0.0 | 94.3 | 97.2 | 84.4 |
| Ergotamine (pH 3) | 97.1 | 100 | 100 | 95.7 | 100 | 100 | 100 |
| Zearalenone (Neutral pH) | 34.3 | 33.0 | 0.0 | 8.1 | 0.8 | 97.0 | 9.3 |
| Zearalenone (pH 3) | N/A | 94.8 | 80.8 | N/A | N/A | 98.4 | N/A |
| Aflatoxin (Neutral pH) | 100 | 95.4 | 100 | 100 | 100 | 100 | 100 |

*Clay numbers with clay descriptions below.
Clay #1: FD 181, a Western clay which is a sodium bentonite (granular)
Clay #2: FD 181, a powdered form of FD 181 (#2)
Clay #3: Panther Creek 150, a Southern clay which is a calcium bentonite
Clay #4: Hectabrite DP, a treated hectorite
Clay #5: Panther Creek 200, smaller particle size than Panther Creek 150
Clay #6: Bleaching Earth (Clarion 470), an acid-activated calcium bentonite
Clay #7: Carmargo White, a highly charged bentonite
COMMENTS: N/A (not applicable) means no test results were obtained.

TABLE 2

MYCOTOXIN ADSORBENCY PERCENTAGES AT VARIED CLAY WEIGHTS

| Mycotoxin/Clay | 0.01 g Clay (%) | 0.05 g Clay (%) | 0.25 g Clay (%) | 0.5 g Clay (%) |
|---|---|---|---|---|
| Fumonisin/Clay | 61.9 | 88.7 | 92.9 | 94.9 |
| Zearalenone/Clay | 38.9 | 76.4 | 94.5 | 97.8 |
| Ergotamine pH 3/Clay | 97.8 | 98.3 | 97.8 | 98.3 |

What is claimed is:

1. A method of increasing the nutritional value of contaminated animal feed ingested by an animal said contamination selected from the group consisting of fumonisin; vomitoxin; ochratoxin; zearalenone; ergot; ergotamine; and mixtures thereof comprising feeding an acid-activated montmorillonite clay to said animal simultaneously with said contaminated animal feed such that said acid-activated montmorillonite clay and said contaminated animal feed are present simultaneously in the digestive tract of said animal, wherein said acid-activated montmorillonite clay fed to said animal is fed in an amount sufficient to aid the metabolic absorption of nutrients from said contaminated animal feed.

2. The method of claim 1, wherein the montmorillonite clay is selected from the group consisting of sodium bentonite, calcium bentonite, and mixtures thereof.

3. The method of claim 1, wherein the acid-activated montmorillonite clay is an acid-activated calcium bentonite clay fed to said animal in an amount of at least about 0.01% based on the weight of contaminated animal feed.

4. The method of claim 3, wherein the acid-activated montmorillonite clay is fed to said animal in an amount of at least about 0.05% based on the weight of contaminated animal feed.

5. The method of claim 4, wherein the acid-activated montmorillonite clay is fed to said animal in an amount of at least about 0.1% based on the weight of contaminated animal feed.

6. The method of claim 5, wherein the acid-activated montmorillonite clay is fed to said animal in an amount of 0.1% to about 1%, based on the weight of contaminated animal feed.

7. The method of claim 6, wherein the acid-activated montmorillonite clay is fed to said animal in an amount of about 0.25% to about 0.5% based on the weight of contaminated animal feed.

8. The method of claim 1, wherein the animal feed is corn infected with mycotoxin in an amount of at least 500 parts per billion by weight.

9. The method of claim 8, wherein the animal feed is corn contaminated with said mycotoxin in an amount of at least 800 parts per billion by weight.

10. A feed composition for achieving weight gain in animals fed mycotoxin-contaminated animal food comprising a mycotoxin-contaminated animal food and at least 0.01% by weight, based on the weight of mycotoxin-contaminated food, of an acid-activated montmorillonite clay.

11. The composition of claim 10 wherein the acid-activated montmorillonite clay is included in an amount of at least about 0.01% by weight, based on the weight of mycotoxin-contaminated food.

12. The composition of claim 11, wherein the acid-activated montmorillonite clay is included in an amount of about 0.01% to about 1% by weight, based on the weight of mycotoxin-contaminated food.

13. The composition of claim 4, wherein the mycotoxin-contaminated animal food is a cereal grain.

14. The composition of claim 13, wherein the mycotoxin-contaminated animal food is corn.

15. The composition of claim 10, wherein the mycotoxin-contaminated animal food is peanuts.

16. The composition of claim 10, wherein the acid-activated montmorillonite clay is an acid-activated calcium bentonite clay.

17. A method of increasing the nutritional value of an animal feed that is contaminated with a mycotoxin other than aflatoxin comprising feeding an acid-activated montmorillonite clay to said animal simultaneously with said contaminated animal feed such that said acid-activated montmorillonite clay and said contaminated animal feed are present simultaneously in the digestive tract of said animal, wherein said acid-activated montmorillonite clay fed to said animal is fed in an amount sufficient to aid the metabolic absorption of nutrients from said contaminated animal feed.

18. The method of claim 17, wherein the animal feed is contaminated with a toxin selected from the group consisting of fumonisin, ergotamine; zearalenone; ochratoxin; ergot; and mixtures thereof.

19. A method of increasing the nutritional value of contaminated animal feed ingested by an animal, wherein said feed is contaminated with a toxin selected from the group consisting of aflatoxin; fumonisin; vomitoxin; ochratoxin; zearalenone; ergot; ergotamine; and mixtures thereof comprising feeding an acid-activated montmorillonite clay to said animal simultaneously with said contaminated animal feed such that said acid-activated montmorillonite clay and said contaminated animal feed are present simultaneously in the digestive tract of said animal, wherein said acid-activated montmorillonite clay fed to said animal is fed in an amount sufficient to aid the metabolic absorption of nutrients from said contaminated animal feed.

\* \* \* \* \*